(12) United States Patent
Marchal et al.

(10) Patent No.: US 11,072,100 B2
(45) Date of Patent: *Jul. 27, 2021

(54) METHOD AND COMPACTION ASSEMBLY FOR MANUFACTURING A COMPOSITE TURBOMACHINE BLADE

(71) Applicant: Safran Aircraft Engines, Paris (FR)

(72) Inventors: Yann Marchal, Melun (FR); Jeremy Engel, Kearney, NE (US); Matthieu Gimat, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 454 days.

This patent is subject to a terminal disclaimer.

(21) Appl. No.: 15/026,918

(22) PCT Filed: Oct. 3, 2014

(86) PCT No.: PCT/FR2014/052512
§ 371 (c)(1),
(2) Date: Apr. 1, 2016

(87) PCT Pub. No.: WO2015/049474
PCT Pub. Date: Apr. 9, 2015

(65) Prior Publication Data
US 2016/0288380 A1 Oct. 6, 2016

Related U.S. Application Data

(60) Provisional application No. 61/886,678, filed on Oct. 4, 2013.

(30) Foreign Application Priority Data

Aug. 21, 2014 (FR) ...................................... 1457909

(51) Int. Cl.
B29C 43/36 (2006.01)
B29B 13/06 (2006.01)
(Continued)

(52) U.S. Cl.
CPC ............ *B29C 43/361* (2013.01); *B29B 11/16* (2013.01); *B29B 13/06* (2013.01); *B29C 43/36* (2013.01);
(Continued)

(58) Field of Classification Search
CPC .............................. B29C 43/361; B29B 11/16
(Continued)

(56) References Cited

U.S. PATENT DOCUMENTS 2,746,514 A 5/1956 Warnken
3,495,494 A * 2/1970 Scott ..................... B29C 43/021
138/174

(Continued)

FOREIGN PATENT DOCUMENTS

CN 1951664 A 4/2007
CN 101065236 A 10/2007
(Continued)

OTHER PUBLICATIONS

Machine translation of WO 2011/036380, published Mar. 31, 2011.*
(Continued)

*Primary Examiner* — Jacob T Minskey
*Assistant Examiner* — Russell E Sparks
(74) *Attorney, Agent, or Firm* — Bookoff McAndrews, PLLC

(57) ABSTRACT

The invention relates to a compaction assembly comprising a shaping mold (24) delimiting an upwardly open housing, capable of receiving a woven preform cut out beforehand (10*a*), and a vertically moveable compaction tool (128) and forming, with the shaping mold, (24), a compaction assem-
(Continued)

bly for the preform placed beforehand in the housing. The compaction tool (128) includes at least one foot portion (128A). The compaction tool (128) comprises at least three separate compaction blocks (1281-1287). Application to the manufacturing of composite fan blades for a turbomachine.

15 Claims, 3 Drawing Sheets

(51) Int. Cl.
*B29L 31/08* (2006.01)
*B29C 70/48* (2006.01)
*B29B 11/16* (2006.01)
*B29K 21/00* (2006.01)

(52) U.S. Cl.
CPC ........ *B29C 70/48* (2013.01); *B29K 2021/006* (2013.01); *B29L 2031/08* (2013.01); *B29L 2031/082* (2013.01)

(58) Field of Classification Search
USPC .......................................................... 264/138
See application file for complete search history.

(56) References Cited

U.S. PATENT DOCUMENTS

| | | | |
|---|---|---|---|
| 5,013,216 A | | 5/1991 | Bailey et al. |
| 5,672,417 A | | 9/1997 | Champenois et al. |
| 6,334,335 B1 | * | 1/2002 | Hirota ..................... C03B 11/08 65/102 |
| 6,558,590 B1 | * | 5/2003 | Stewart .................. B29C 43/10 264/134 |
| 6,688,870 B2 | * | 2/2004 | Shibata ..................... B05C 3/12 264/1.25 |
| 9,248,586 B2 | * | 2/2016 | Perrier .................... B29C 43/32 |
| 2007/0071948 A1 | * | 3/2007 | Yokoyama ............ B29C 33/424 428/172 |
| 2010/0102482 A1 | * | 4/2010 | Jones ..................... B29C 33/307 264/320 |
| 2011/0100540 A1 | * | 5/2011 | Mathew ............. B29D 99/0014 156/245 |
| 2014/0175704 A1 | | 6/2014 | Eberdt et al. |

FOREIGN PATENT DOCUMENTS

| | | | | |
|---|---|---|---|---|
| CN | 102958681 A | | 3/2013 | |
| DE | 10 2011 104 366 A1 | | 12/2012 | |
| EP | 1 777 063 A1 | | 4/2007 | |
| FR | 2 861 143 A1 | | 4/2005 | |
| FR | 2 892 339 A1 | | 4/2007 | |
| FR | 2 950 286 A1 | | 3/2011 | |
| JP | S62-037135 A | | 2/1987 | |
| JP | 2004-322442 A | | 11/2004 | |
| JP | 2007-112132 A | | 5/2007 | |
| JP | 2010-173196 A | | 8/2010 | |
| RU | 2093362 C1 | | 10/1997 | |
| RU | 2094234 C1 | | 10/1997 | |
| RU | 2271928 C1 | | 3/2006 | |
| WO | WO-2011036380 A1 | * | 3/2011 | ............. B29C 70/48 |
| WO | WO-2012104084 A1 | * | 8/2012 | ............. B29C 70/48 |

OTHER PUBLICATIONS

English Translation of Search Report dated Jan. 16, 2015, in corresponding International PCT Application No. PCT/FR2014/052512, filed on Oct. 3, 2014 (3 pages).
First Office Action and English translation dated Mar. 31, 2017, in corresponding Chinese App. No. 201480058777.1 (10 pages).
Office Action in corresponding Japanese Patent Application No. 2016-520063 dated Aug. 21, 2018, (6 pages).
Office Action in corresponding Japanese Patent Application No. 2016-520063 dated Jul. 30, 2019, (9 pages).
Office Action in related Japanese Patent Application No. 2019-218272, dated Dec. 15, 2020 (8 pages).

* cited by examiner

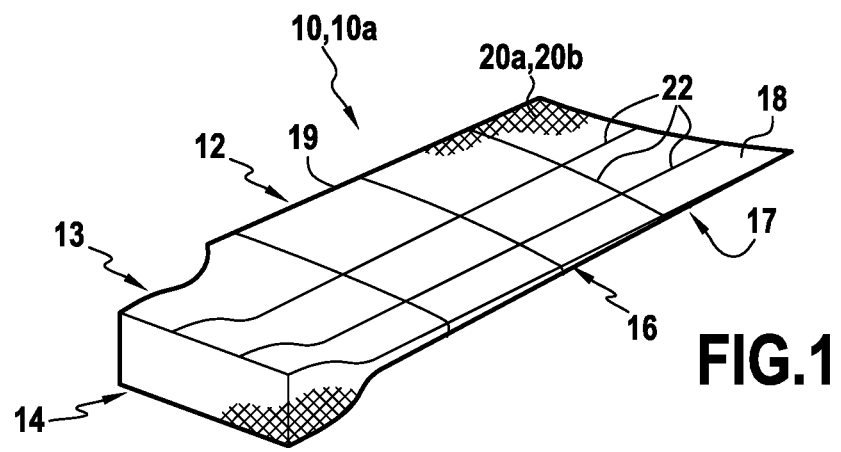
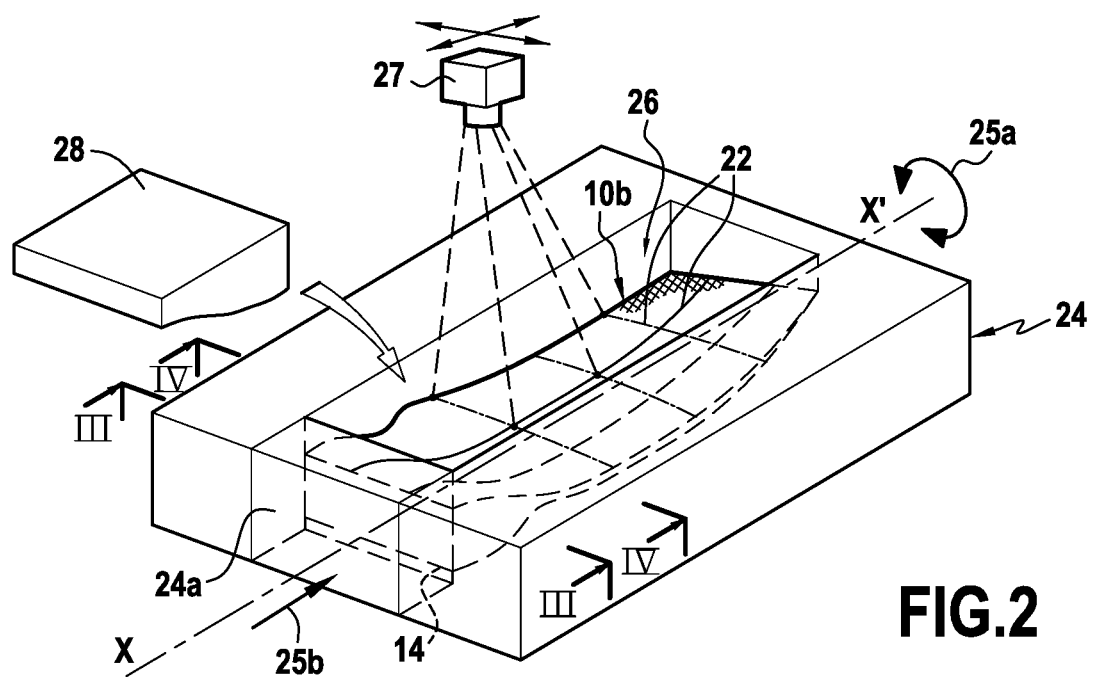

METHOD AND COMPACTION ASSEMBLY FOR MANUFACTURING A COMPOSITE TURBOMACHINE BLADE

CROSS-REFERENCE TO RELATED APPLICATIONS

This application is the U.S. national phase entry under 35 U.S.C. § 371 of International PCT Application No. PCT/FR2014/052512, filed on Oct. 3, 2014, which claims priority to French Patent Application No. FR 1457909, filed on Aug. 21, 2014, and to U.S. Provisional Patent Application No. 61/886,678, filed Oct. 4, 2013, the entireties of each of which are incorporated by reference herein.

TECHNICAL FIELD

The present disclosure relates to a method for manufacturing a composite turbomachine blade and to a compaction assembly used in this method. The composite blade may be of the type comprising a preform in three-dimensionally-woven yarns or fibers and a binder maintaining the relative arrangement between the yarns of the preform. Said preform may be formed with warp yarns and weft yarns, the direction of the warp yarns forming the longitudinal direction of the preform.

In particular, the present method relates to the manufacturing of a fan blade for a turbomachine, notably a turbojet engine. However, the manufacturing of a blade intended for a low pressure compressor is also contemplated, where the attained operating temperatures are compatible with the thermomechanical strength of this type of blade. Also, the manufacturing of open rotor blades or blades with integrated platform is contemplated.

BACKGROUND

Customarily, fan blades made in a composite material, in particular in carbon fibers, are made from a stack of pre-impregnated unidirectional plies which are placed in a mold by orienting the successive plies differently, before compaction and polymerization in the autoclave. This very delicate technique requires the carrying out of operations for stacking plies manually, which is long and costly.

The preparation of woven preforms was also proposed, with dry fibers, which are then assembled by sewing, before impregnation with a resin by injection into a closed mold. One alternative consisted of producing a single woven preform which is mounted with one or several solid inserts before injection. These solutions (U.S. Pat. Nos. 5,672,417 and 5,013,216) however have the drawback of requiring the assembling of several parts and of generating in these assembling areas, particularly weak sites, for example with respect to delamination, which is very detrimental in terms of mechanical strength, notably for impact resistance.

In order to overcome these drawbacks, patent document FR 2 861 143 proposed the making of a preform in yarns or fibers woven in three-dimensions giving the possibility of forming with it alone, after optional cutting out and injection of the binder, the final part forming all the portions of the turbomachine blade, without resorting to the use of inserts or of any other added element.

In particular, the manufacturing method shown in patent document FR 2 892 339 is used, during which the woven and then cut-out preform is shaped in a mold before injecting the binder and proceeding with the curing of the binder.

However, a certain number of problems related to how this shaping is achieved, persist today.

General Presentation

The present disclosure relates to a compaction assembly with which the above-mentioned drawbacks may be avoided. In particular this compaction assembly allows the preform to be pre-compacted.

The compaction assembly may be used for a preform obtained by weaving yarns in three dimensions and intended to form a composite turbomachine blade, said preform comprising at the same time the airfoil, the foot of the blade and, between the airfoil and the foot, the root of the blade.

This compaction assembly comprises a shaping mold delimiting an upwardly open housing, suitable for receiving a woven preform (which may be cut out beforehand), and a vertically moveable compaction tool cooperating with the shaping mold in order to form a compaction assembly allowing compaction of said preform when placed in the housing. The compaction assembly defines a longitudinal direction and a vertical middle plane parallel to the longitudinal direction.

The compaction tool may comprise at least three separate compaction blocks, among which are a central compaction block passing through said middle plane and two side compaction blocks located at the side edges of said compaction tool, said compaction blocks being adapted to move downwards one by one towards the shaping mold in an independent way, starting with the central compaction block.

The compaction tool may be configured to go downward in the direction of the shaping mold.

The present disclosure also deals with a method for manufacturing a composite turbomachine blade, using a compaction assembly.

BRIEF DESCRIPTION OF THE DRAWINGS

Other advantages and features of the invention will become apparent upon reading the following description referring to the appended drawings wherein:

FIG. 1 is a general perspective view of an example of a preform, after being cut out, FIG. 2 illustrates a step of an example of manufacturing method.

DETAILED DESCRIPTION

Figure 3:
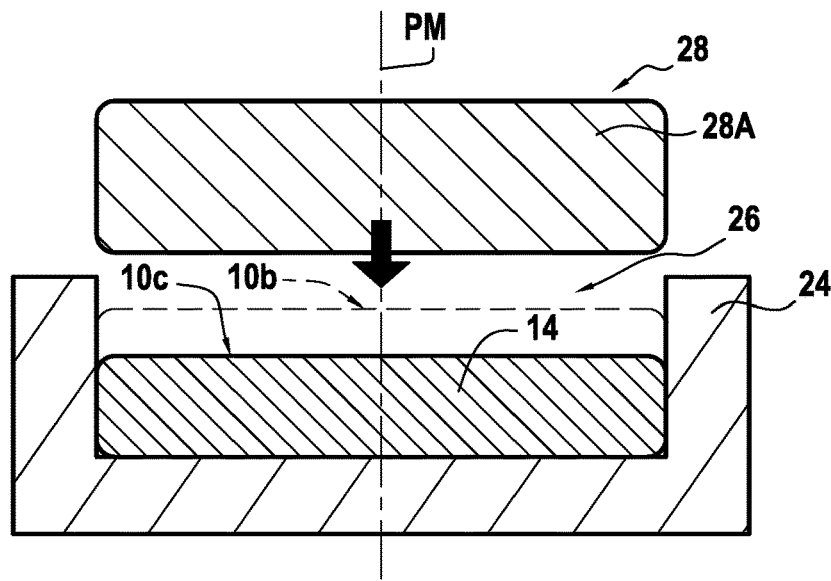
FIGS. 3 and 4 are sectional views along the directions III and IV of FIG. 2 showing the effect of compaction on the profile of two different portions of the preform, with a compaction assembly according to a first embodiment of the present invention.

In the following detailed description, it is referred to the accompanying drawings showing examples of compaction assembly or examples of manufacturing process. It is intended that these examples be considered as illustrative only, the scope of the invention not being limited to these examples.

In an illustrative embodiment, the manufacturing method begins with a first step a) consisting of making a three-dimensional preform 10 by weaving, the woven preform including warp yarns 20a and weft yarns 20b. In both of these groups of yarns, tracer yarns 22 visually identifiable with respect to the other yarns and regularly located at least at the surface of the preform are provided.

The warp and weft yarns may belong, for example, to the group formed by carbon fibers, glass fibers, silica fibers, silicon carbide fibers, alumina fibers, aramid fibers and aromatic polyamide fibers.

The woven preform in one piece is then cut out according to a second step b) of the method. More exactly, this woven preform is outlined by cutting out the contour according to a predetermined three-dimensional abacus provided so that after deformation, the preform observes the geometry of the finished part. This cutting out may be carried out with a water jet and/or with mechanical means (scissors, cutter, saw . . . ) and/or by cutting out with a laser.

This results in a cut-out preform 10a as visible in FIG. 1. The portions intended to form the airfoil 12 and the foot 14 of the blade, as well as the root 13 which is the transition portion between the airfoil 12 and the foot 14. In particular, the warp yarns 20a and the weft yarns 20b used for weaving in 3 dimensions are carbon fibers (black), and glass or Kevlar fibers (white) form tracer yarns 22 essentially located at the surface of the preform, along the main longitudinal direction parallel to the warp yarns 20a and along the transversal direction parallel to the weft yarns 20b. In this way, the tracer yarns 22 appear with a white color on the remainder of the preform which is black, and the tracer yarns 22 are therefore very visible. Additionally, these tracer yarns are detectable with conventional non-destructive inspection technologies (X-ray or ultrasonic tomography type) allowing the compliance of the final part to be checked.

In particular, these tracer yarns 22 are present here at the surface of both faces (respectively intended to form the pressure-side wall 17 and the suction-side wall 18) of the blade at predetermined locations in order to be used as a reference point for the positioning with view to the cutting and other steps for treating the preform as this will be discussed hereafter.

During this cutting step, it is intended to keep a series of tracer yarns 22 located at the surface of the preform along at least one reference face 16, which, in the illustrated case is the face intended to form the leading edge.

Next, step c) is carried out in which pre-deformation of the cut-out preform 10a is achieved.

In particular, during step c), said pre-deformation is achieved by placing the cut-out preform 10a in a shaping mold 24 (FIG. 2) having different portions delimiting between them a cavity or housing 26 intended to house the cut-out preform 10a and having marks used as a reference for positioning at least some of the tracer yarns 22.

Different systems for localizing and positioning the cut-out preform 10a may be used, in particular a laser projector 27 (see FIG. 2) which projects a light beam to the ideal location of a tracer yarn 22 so that it is then easy to move accordingly the corresponding tracer yarn 22 in order to obtain the predetermined positioning.

Alternatively or additionally, masks, taking up again the contour and/or the position of all or part of the tracer yarns 22, may be positioned on the preform in order to check its proper positioning.

When the cut-out preform 10a is positioned in the shaping mold 24, the cut-out preform 10a is placed in a configuration which deforms it by applying a rotation (arrow 25a in FIG. 2) around an axis XX' parallel to its main direction, which has the consequence of twisting the airfoil around this axis.

In some cases, provision can also be made for the shaping mold 24 to present a moving portion 24a that is slidable and designed to come into position against the free end of the foot 14 of the preform so as to exert stress (arrow 25b), thereby producing the desired deformation of this portion 14 of the preform, or avoiding certain types of deformation in this portion, while deformation is being applied to other portions of the preform 10b.

It should be understood that numerous different possibilities can be envisaged for shaping the cut-out preform 10a by making use of the tracer yarns 22 as reference elements for positioning the preform 10a in the shaping mold 24.

The strategy for placing the cut-out preform 10a in the shaping mold 24 is also related to the cutting-out or outlining profile made before, according to the selected reference surface(s), in particular from among the foot, the head, the leading edge 16, the trailing edge 19 or any other predetermined area.

The cut-out preform 10a may be put into place in the shaping mold 24 in a manner that is sufficiently accurate to perform all of the deformations needed in order to achieve the desired final shape. However, it is also possible to perform this step c) as a plurality of sub-steps.

A binder comprising a thermosetting resin is then injected into said injection mold in order to impregnate the whole preform and to maintain the relative arrangement between the yarns of the preform; said injection mold is heated; and a composite molded part is extracted from the mold, substantially having the shape and the dimensions of said blade In a step d) following step c) and before injecting said binder, pre-compaction of at least one portion of the pre-deformed preform 10b comprising the foot and preferably the foot 14 and the root 13, is achieved over the whole width of the pre-deformed preform 10b. This pre-compaction blocks certain fibers in an intended position, whence an intermediate geometry of the preform, which still further approaches the intended final shape.

The compaction tool 28 used for this purpose, schematically and partly visible in FIG. 2, may be made by completing the shaping mold 24 with the required pieces of equipment. Indeed, the compaction tool 28 is moveable (up and down) and should be able to be brought to a temperature of the order of 100° C.

During this step d), the sizing products coating the yarns and which are used for facilitating weaving, are the ones which allow the blocking of the relative position of the fibers of the pre-compacted portion.

Subsequently, wetting of the pre-compacted preform 10c is performed and drying in an oven is performed, by means of which a stiffened preform is provided. In fact, this stiffening will sufficiently set the shape given during step c) to the cut-out preform 10a, having become the pre-deformed preform 10b, so that it may easily be placed subsequently in the injection mold 24 without substantially changing its shape which corresponds to that of the aforementioned pre-deformation.

If necessary, it is optionally possible to add a tackifying agent inside the preform, for example a diluted resin, notably of the epoxide type, the whole giving the possibility under the effect of the heat and of the pressure which are exerted during the pre-compaction step d), of having the woven carbon fibers adhere to each other in order to avoid that the pre-deformed preform 10b undergoes any subsequent deformation notably during the injection step.

The compaction tool 28 has a shape and dimensions which allows it to be inserted into the housing 26 of the shaping mold in order to allow compaction of the woven preform to an intermediate fiber volume level relatively to the definitive fiber volume level of the final part. For example, the target volume level of fibers for a compacted preform obtained with the compaction tool 28 is between 35% end 55%, so that the final part, after injection, presents a target volume level of fibers between 50% and 60%.

Figure 4:
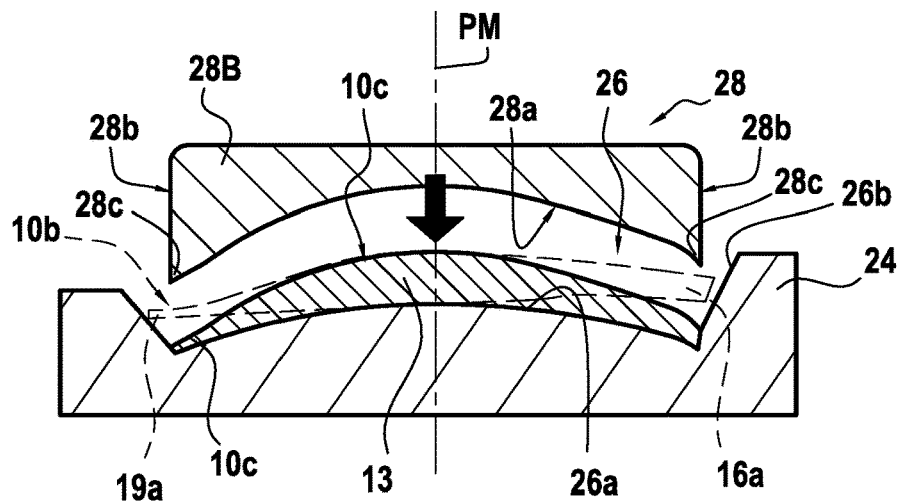

Reference is now made to FIGS. 3 and 4, illustrating a cross-sectional view of a pre-deformed preform 10b and a compaction assembly according to an embodiment (shaping mold 24 and compaction tool 28). FIG. 3 is a cross-sectional view at the foot 14 while FIG. 4 is a cross-sectional view at the root 13 of the preform 10b. These figures illustrate how the pre-deformation is applied on these different portions of the pre-deformed preform 10b (dotted lines) in order to obtain the compacted preform 10c (solid line).

For the foot 14 (FIG. 3), the housing 26 of the shaping mold 24 has a rectangular section and the compaction tool 28 has foot portion 28A, the rectangular section of which is mating that of the housing 26.

For the root 13 (FIG. 4), the housing 26 of the shaping mold 24 has a section with a convex bottom 26a and flared sides 26b towards the aperture of the housing 26. The compaction tool 28 has a root portion 28B, the section of which includes substantially vertical sides 28b and a bottom 28a, intended to come and face the convex bottom of the shaping mold 24. This bottom 28a is concave with a profile having larger radii of curvature than the convex profile of the bottom of the housing 26 of the shaping mold 24.

The compaction tool 28 according to this embodiment is in one piece so that during its movement, it moves down (or up) as a whole, into (or from) the housing 26 of the shaping mold 24, thus compressing the pre-deformed preform 10b.

In order to avoid damaging the fibers of the pre-deformed preform 10b, and notably to avoid nipping them, the surfaces of the shaping mold 24 and the compaction tool 28, turned towards the housing, do not have any (protruding or re-entrant) sharp edge but consist of faces with rounded angles by rounded or radially arranged links forming fillets.

In such a situation, when the compaction tool 28 moves downwards, if the root portion 28B which will compact the root 13 of the preform (FIG. 4) is considered, firstly the side edges 16a and 19a of the pre-deformed preform 10b, intended to respectively form the leading edge 16 and the trailing edge 19, are the ones which come into contact with the compaction tool 28 at the location of the side edges 28c of the bottom 28a. Next, contact is gradually made with the whole surface of the root 13 turned facing the compaction tool 28, finishing with the central area (strip) of the surface, this central area passing through a middle plane PM of the compaction assembly.

This middle plane PM, which is not necessarily a plane of symmetry for the compaction assembly and for the preform, is vertical, parallel to the axis XX' oriented along the main direction of the preform, and is found at half distance both between the side edges 26b of the housing 26 of the shaping mold 24 and between the side edges 28b of the compaction tool 28.

Figure 5:
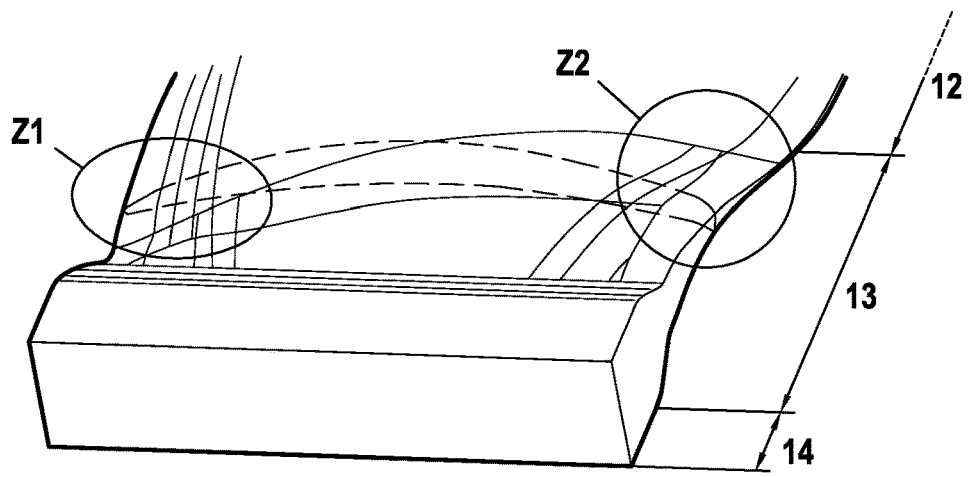
FIG. 5 is a partial view of the preform of FIG. 1, showing the foot and the root as an enlargement.

This configuration may sometimes have certain drawbacks regarding the pre-deformation of the root 13: in the case of FIGS. 4 and 5, the side edges 16a and 19a of the pre-deformed preform 10b being thinner in thickness on the one hand and undergoing larger flexure than the remainder of the root 13, the fibers 20 forming the preform undergo buckling, which may be detrimental to the proper thermal mechanical strength of the final blade.

The areas of the cut-out preform 10a which undergo this undesirable buckling, are indicated in FIG. 5 at both locations Z1 and Z2 corresponding to the thin edges of the root 13 located in proximity to the airfoil 12.

To avoid the above-mentioned drawbacks, the compaction tool of the compaction assembly includes at least one foot portion and the compaction tool includes at least three separate compaction blocks, among which are a central compaction block passing through said middle plane and two side compaction blocks located at the side ends of said compaction tool, said compaction blocks being able to move downwards one by one towards the shaping mold in an independent way, starting with the central compaction block.

In this way, the compaction tool may be formed with at least three portions and it is possible to have these portions move down at different moments, starting with the central compaction block which first moves down so that the first contact between the compaction tool and the cut-out preform is made at the central area of the surface of the root turned facing the compaction tool.

In this way, by means of the compaction assembly of the invention, the side edges of the root of the preform are compacted lastly, which gives the possibility of minimizing or even avoiding the buckling of fibers of these small thickness areas during the pre-compaction step.

The compaction tool may include an odd number of separate compaction blocks, so as to form a geometry with a central compaction block passing through said middle plane and on either side of this central compaction block, an identical number of other compaction blocks.

This solution also has the advantage of making it further possible to dose the pre-compaction level exerted by each of these compaction blocks on the preform, which may be measured by the intermediate fiber volume level resulting from this pre-compaction.

In certain embodiments, said compaction blocks are capable of moving down one by one towards the shaping mold in an order which compacts the whole width of said preform, starting with said central compaction block and then each compaction block adjacent to the one having moved down previously, and this until the side compaction block.

Figure 7:
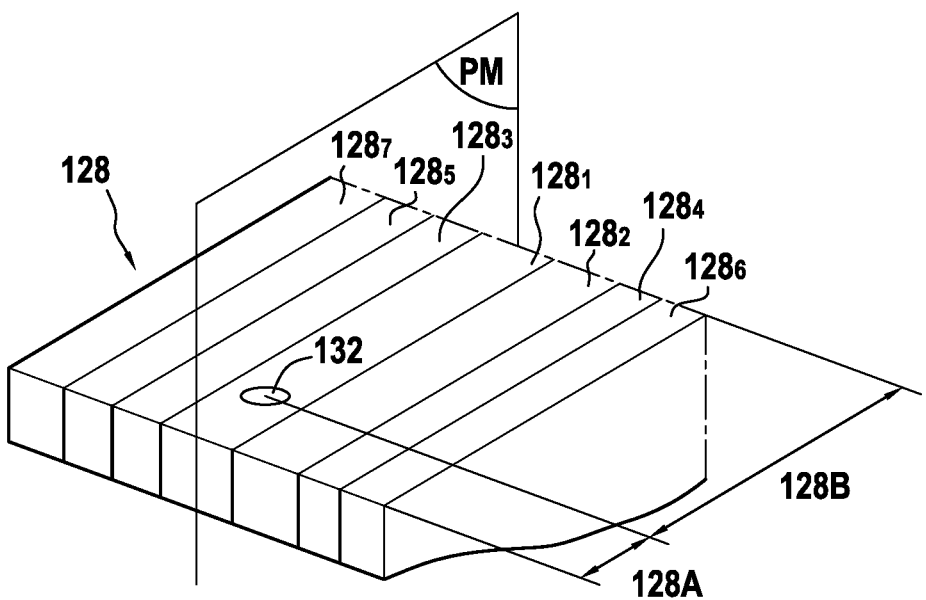
FIG. 7 is a perspective view of the compaction tool of the compaction assembly of FIG. 6.

In certain embodiments, the compaction tool includes only one foot portion. In other embodiments, the compaction tool includes a foot portion 128A and a root portion 128B, as illustrated in FIG. 7.

In certain embodiments, said compaction blocks are capable of moving down towards the shaping mold, starting with the central compaction block, and then with all the compaction blocks found on one of the sides of the middle plane, preferably one by one and in series from the central compaction block until the second side compaction block.

Alternatively, said compaction blocks are capable of moving down towards the shaping mold in a symmetrical way relatively to the middle plane.

In certain embodiments, the whole compaction tool 128 is divided into at least three separate compaction blocks, among which is a central compaction block $128_1$ passing through the middle plane PM of the compaction tool $128_1$ said compaction blocks being capable of moving down towards the shaping mold 24 independently, starting with the central compaction block $128_1$.

Figure 6:
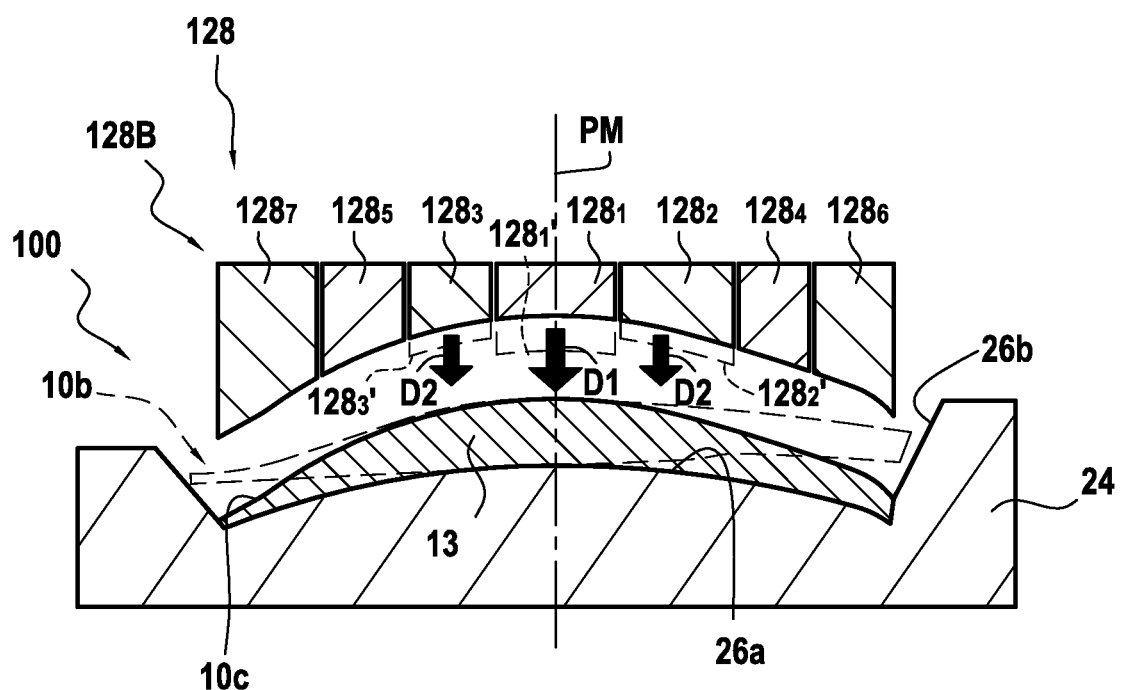
FIG. 6 is a sectional view similar to that of FIG. 4, showing another example of a compaction assembly.

In the example of FIGS. 6 and 7, the whole compaction tool 128 is divided into seven separate compaction blocks $128_1, 128_2, 128_3, 128_4, 128_5, 128_6, 128_7$, distributed around and on either side of the middle plane PM.

In this way, it is possible to break down the downward movement of the whole compaction tool 128 (foot portion 128A and root portion 128B), starting with the central compaction block $128_1$ passing through the middle plane PM of the compaction tool 128 (downward pointing arrow D1 and dotted line $128_1$' in FIG. 6), and then both compaction blocks $128_2$ and $128_3$ located on either side of the central compaction block $128_1$ (downward pointing arrows D2 and D3 and dotted lines $128_2$' and $128_3$' in FIG. 6), and so forth until both side compaction blocks $128_6$ and $128_7$ located at the side edges of the compaction tool 128.

As illustrated in FIG. 7, optionally, the compacting tool 128 includes at least one window 132 giving the possibility of viewing the position of at least one tracer yarn when the preform is placed in the housing delimited between the shaping mold 24 and the compaction tool 128. This window 132 for example consists of a portion of the compaction tool 128 made in a transparent material or preferably an aperture passing right through the whole thickness of the compaction tool 128. This window 132 may be positioned in an area of the root portion 128B which is adjacent to the foot portion 128A, preferably at the central compaction block $128_1$. Such a window 132 notably gives the possibility of making sure that the tracer yarn(s) 22 visible through this window (for example the span exit tracer yarn) are properly positioned and remain so during the compaction operation.

In the example illustrated in FIGS. 6 and 7, the compaction tool 128 is divided into seven separate compaction blocks $128_1$, $128_2$, $128_3$, $128_4$, $128_5$, $128_6$, $128_7$.

The compaction blocks $128_1$, $128_2$, $128_3$, $128_4$, $128_5$, $128_6$, $128_7$ may also move down for compacting the preform 10b with different speeds and/or forces exerted by these compaction blocks on the preform which are different, whence pre-compaction levels or intermediate fiber volume levels resulting from this pre-compaction which are different among the compaction blocks $128_1$, $128_2$, $128_3$, $128_4$, $128_5$, $128_6$, $128_7$.

In the illustrated examples, there are seven compaction blocks $128_1$, $128_2$, $128_3$, $128_4$, $128_5$, $128_6$, $128_7$, but generally at least five of them may be provided, for example exactly five.

A method for manufacturing a composite turbomachine blade, may comprise the following steps:

a) a preform is made by weaving yarns 20a, 20b, 22 in three dimensions, said preform comprising at the same time the airfoil 12, the foot 14 of the blade and between the airfoil 12 and the foot 14, the root 13 of the blade, the yarns 20 comprising visually identifiable tracer yarns 22 positioned at least at the surface of the preform;

b) said preform is cut out while leaving a series of tracer yarns 22 intact, located along a reference face 16 of the preform, whereby a cut-out preform 10a is provided, capable of assuming the shape and the dimensions of the constitutive portions of the blade;

c) said cut-out preform 10a is pre-deformed, whereby a pre-deformed preform 10b is provided;

d) pre-compaction of said pre-deformed preform 10b is achieved, whereby a pre-compacted preform 10c is provided;

e) wetting of the pre-compacted preform 10c is performed and drying in an oven is performed, whereby a stiffened preform is provided;

f) an injection mold 24 injection is provided, in which said stiffened preform is placed;

g) a binder comprising a thermosetting resin is injected into said injection mold, in order to impregnate the whole stiffened pre-deformed preform and to maintain the relative arrangements between the yarns 20a, 20b, 22 of the stiffened preform;

h) said injection mold is heated; and i) a composite molded part is extracted from the mold, substantially having the shape and the dimensions of said blade, During step c), said pre-deformation is carried out by placing the cut-out preform 10a in the housing 26 delimited by a shaping mold 24 and in that, during step d), said pre-compaction of said pre-deformed preform 10b is carried out by using a moveable compaction tool 128 and cooperating with the shaping mold 24 in order to form a compaction assembly defining the longitudinal direction and a vertical middle plane PM parallel to the longitudinal direction.

Thus, during step d), the compaction tool 28 may preferably go down towards the shaping mold 24.

According to a preferred embodiment, said compaction tool 128, is capable, during step d), of compacting at least the foot 12 of said pre-deformed preform 10b by starting with the middle and then advancing gradually until the edge of the pre-deformed preform 10b.

Thus, by means of this advantageous provision, fiber buckling is avoided in the foot area 12 and the root area 13 of the preform during the compaction step.

In this method, during step d), said compaction tool 128 is capable of moving downwards towards the shaping mold 24 so that said compaction blocks move downwards one by one towards the shaping mold 24 in an order which compacts the whole width of said preform 10b by starting with its central portion passing through the middle plane PM and then each portion adjacent to the previous one, with gradually greater offsets from the middle plane PM. During step d), said compaction tool 128 may be capable of moving downwards towards the shaping mold 24 in a symmetrical way relatively to said middle plane PM.

In the figures, the case of a foot 14 which remains rectilinear throughout the manufacturing method is illustrated. It is understood that without departing from the scope of the present invention, it is possible to envision the case of a foot which is twisted, or deformed according to any other action, when it is placed in the shaping mold 24.

Moreover, according to an alternative embodiment not shown, the compaction tool 128 not only covers the foot 14 and the root 13 of the airfoil, but also a portion of the airfoil 12 of the blade.

Also, in the foregoing description, it was mentioned that the compaction tool 128 carried out a pre-compaction step, i.e. step d). However, it is also possible to use this compaction tool 128 alternatively as an element of the injection mold 24 and to only use it for steps f) and g). According to another alternative, it is possible to use this same compaction tool 128 both for the pre-compaction step d) and for steps f) and g).

"Comprises/comprising" when used in this specification is taken to specify the presence of stated features but does not preclude the presence or addition of one or more other features.

The above description is given by way of example, and not limitation. Given the above disclosure, one skilled in the art could devise variations that are within the scope of the invention. Further, the various features of the embodiments or examples disclosed herein can be used alone or in varying combinations with each other, and are not intended to be limited to the specific combinations disclosed herein.

The invention claimed is:

1. A compaction assembly for a woven preform obtained by three-dimensional weaving of yarns and intended to form a composite turbomachine blade with an airfoil, a foot and a root, said preform comprising parts predefining the airfoil, the foot of the blade and, between the airfoil and the foot, the root of the blade, the compaction assembly comprising a shaping mold delimiting an upwardly open cavity, suitable for receiving the woven preform, and a vertically moveable compaction tool and cooperating with the shaping mold to form the compaction assembly allowing compaction of said preform when placed in the cavity, wherein the compaction tool comprises at least one foot portion and wherein said compaction assembly defines a longitudinal direction and a vertical middle plane parallel to the longitudinal direction, the compaction tool comprising at least three separate compaction blocks, among which are a central compaction block passing through said middle plane and two side compaction blocks located at side edges of said compaction tool, said compaction blocks being adapted to move downwards one by one towards the shaping mold in an independent way, starting with the central compaction block, and wherein the shaping mold comprises, perpendicular to the longitudinal direction, a cross section with a convex bottom, and flared sides, to receive the compaction tool when the compaction tool moves downward, and the compaction tool having a concave bottom facing the convex bottom of the shaping mold, the concave bottom of the compaction tool having a greater radius of curvature as compared to the convex bottom of the shaping mold.

2. The compaction assembly according to claim 1, wherein the compaction blocks are configured to move downwards one by one towards the shaping mold, starting with said central compaction block and then with each compaction block adjacent to the one having moved downward previously, and this until the side compaction block, so as to compact a whole width of said preform.

3. The compaction assembly according to claim 1, wherein the compaction tool has at least one window configured to give the possibility of viewing the position of at least one tracer yarn when the preform is placed in the cavity.

4. The compaction assembly according to claim 1, wherein the convex bottom of the shaping mold is positioned laterally between the flared sides of the shaping mold along a lateral axis that is perpendicular to both an upward-downward direction and the longitudinal direction.

5. The compaction assembly according to claim 4, wherein each of the flared sides extends upwardly and laterally outwardly from respective ends of the convex bottom of the shaping mold.

6. The compaction assembly according to claim 1, wherein the vertical middle plane extends through the convex bottom of the shaping mold.

7. The compaction assembly according to claim 1, wherein the central compaction block includes a portion of the concave bottom of the compaction tool configured to move toward the convex bottom of the shaping mold when the central compaction block is positioned in the cavity.

8. The compaction assembly according to claim 1, wherein the central compaction block includes a portion of the concave bottom of the compaction tool that faces a peak formed by the convex bottom of the shaping mold when the central compaction block is positioned in the cavity.

9. The compaction assembly according to claim 1, wherein the concave bottom of the compaction tool is formed at a first portion of the compaction tool, and the compaction tool includes a second portion having a flat bottom.

10. A compaction assembly for a woven preform obtained by three-dimensional weaving of yarns and intended to form a composite turbomachine blade with an airfoil, a foot and a root, said preform comprising parts predefining the airfoil, the foot of the blade and, between the airfoil and the foot, the root of the blade, the compaction assembly comprising a shaping mold delimiting an upwardly open cavity, suitable for receiving the woven preform, and a vertically moveable compaction tool and cooperating with the shaping mold to form the compaction assembly allowing compaction of said preform when placed in the cavity, wherein the compaction tool comprises at least one foot portion and wherein said compaction assembly defines a longitudinal direction and a vertical middle plane parallel to the longitudinal direction, the compaction tool comprising at least three separate compaction blocks, among which are a central compaction block passing through said middle plane and two side compaction blocks located at side edges of said compaction tool, said compaction blocks being adapted to move downwards one by one towards the shaping mold in an independent way, starting with the central compaction block, and wherein the shaping mold comprises, perpendicular to the longitudinal direction, a cross section with a convex bottom when viewed from a point between the compaction tool and the shaping mold, and flared sides, to receive the compaction tool when the compaction tool moves downward, and the compaction tool having a concave bottom when viewed from the point between the compaction tool and the shaping mold, the concave bottom of the compaction tool facing the convex bottom of the shaping mold, the concave bottom of the compaction tool having a greater radius of curvature as compared to the convex bottom of the shaping mold.

11. The compaction assembly of claim 10, wherein the side edges of the compaction tool are positioned between the flared sides when the compaction blocks are received by the shaping mold.

12. The compaction assembly of claim 11, wherein the compaction blocks are shaped to be positioned side by side in a direction orthogonal to the longitudinal direction when the compaction blocks are received by the shaping mold.

13. The compaction assembly of claim 10, wherein a compaction block of the at least three separate compaction blocks includes a part of the foot portion that has a flat bottom and a root portion that forms a part of the concave bottom of the compaction tool.

14. A method for manufacturing a composite turbomachine blade with an airfoil, a foot and a root, comprising the following steps:
   a) a preform is made by three-dimensional weaving of yarns, said preform comprising parts defining the airfoil, the foot of the blade and, between the airfoil and the foot, the root of the blade, the yarns comprising visually identifiable tracer yarns positioned at least at the surface of the preform;
   b) the preform is cut out while leaving intact a series of tracer yarns located along a reference face of the preform, whereby a cut-out preform configured to predefine the shape and the dimensions of the airfoil, the foot, and the root of the blade is provided;
   c) the cut-out preform is pre-deformed, whereby a pre-deformed preform is provided;
   d) pre-compaction of said pre-deformed preform is achieved, whereby a pre-compacted preform is provided;
   e) wetting and drying the pre-compacted preform are performed, whereby a stiffened preform is provided;
   f) an injection mold is provided in which said stiffened preform is placed;
   g) a binder comprising a thermosetting resin is injected into said injection mold in order to impregnate an entirety of the stiffened preform and to maintain the relative arrangement between the yarns of the stiffened preform;

h) said injection mold is heated; and i) a composite molded part is extracted from the mold, substantially having the shape and the dimensions of said blade, wherein, during steps c) and d), a compaction assembly according to claim 1 is used, said pre-deformation being achieved during step c) by placing the cut-out preform in the cavity delimited by the shaping mold of the compaction assembly and the pre-compaction being achieved during step d) by using the moveable compaction tool of the compaction assembly cooperating with the shaping mold of the compaction assembly, wherein, during step d), at least the foot part of the preform defining the foot of the blade is pre-compacted, and wherein the preform is pre-compacted starting with a central portion and gradually advancing until the edge of the preform.

15. The method according to claim 14, wherein and, during step d), the compaction tool is moved downwards towards the shaping mold in such a way that said compaction blocks move downwards one by one towards the shaping mold in an order starting with the central portion of the preform and then each portion adjacent to the previous one, so that a whole width of the preform is compacted.

* * * * *